United States Patent
Benway

(10) Patent No.: US 7,765,782 B2
(45) Date of Patent: Aug. 3, 2010

(54) CLEANOUT MECHANISM FOR GRASS DISCHARGE AND COLLECTION CHUTE

(75) Inventor: Randy Edward Benway, Horicon, WI (US)

(73) Assignee: Deere & Company, Moline, IL (US)

( * ) Notice: Subject to any disclaimer, the term of this patent is extended or adjusted under 35 U.S.C. 154(b) by 102 days.

(21) Appl. No.: 12/105,066

(22) Filed: Apr. 17, 2008

(65) Prior Publication Data
US 2009/0260338 A1   Oct. 22, 2009

(51) Int. Cl.
*A01D 43/06* (2006.01)
(52) U.S. Cl. ....................................................... 56/202
(58) Field of Classification Search ............... 56/199, 56/202–206, 255, 320.2
See application file for complete search history.

(56) References Cited

U.S. PATENT DOCUMENTS

| | | | |
|---|---|---|---|
| 4,637,203 A * | 1/1987 | Fedeli | 56/202 |
| 4,773,205 A | 9/1988 | Hansen et al. | |
| 5,033,260 A | 7/1991 | Jerry | |
| 5,076,045 A * | 12/1991 | McClung, IV | 56/202 |
| 6,050,072 A | 4/2000 | Chabrier et al. | |
| 6,672,043 B2 | 1/2004 | Shibata et al. | |
| 6,966,169 B2 * | 11/2005 | Osborne | 56/202 |
| 7,047,715 B2 | 5/2006 | Suhara et al. | |
| 2006/0201123 A1 * | 9/2006 | Umemoto et al. | 56/16.6 |

FOREIGN PATENT DOCUMENTS

GB          2356121          5/2001
JP          2008/182997      8/2008

* cited by examiner

*Primary Examiner*—Robert E Pezzuto
*Assistant Examiner*—Mai T Nguyen

(57) ABSTRACT

A cleanout mechanism is disclosed for a grass discharge and collection chute on a mower. The cleanout mechanism includes a door pivotable downwardly from the chute to provide an opening in a bottom surface of the chute, and a wiper pivotable rearwardly along the bottom surface of the chute toward a position adjacent the opening. An operator control is connected through linkages to the door and the wiper to pivot both of the door and the wiper while permitting continued operation of the mower.

19 Claims, 4 Drawing Sheets

CLEANOUT MECHANISM FOR GRASS DISCHARGE AND COLLECTION CHUTE

FIELD OF THE INVENTION

This invention relates to mowing machines for cutting grass and other vegetation, and more specifically to rear discharge/rear collection mower decks that discharge and/or collect grass clippings through a discharge and collection chute.

BACKGROUND OF THE INVENTION

Rotary mowers may have one or more cutter blades mounted to generally vertical shafts, with the cutter blades positioned under a mower deck. Rear discharge/rear collection mower decks may utilize the "cut and throw" approach in which the blades throw cut grass clippings into a discharge and collection chute which may be connected to a rear mounted collection container or hopper.

Grass discharge and collection chutes on rear discharge/rear collection mower decks tend to plug up with grass clippings, especially while cutting heavy, thick or wet grass. Additionally, grass clippings that are too small, and/or have insufficient mass, tend to accumulate in the chute instead of being propelled through the chute into a collection container. A cleanout mechanism for a grass discharge and collection chute is needed that will prevent or reduce clogging the chute with grass clippings during use.

To lift heavy grass clippings, and avoid or reduce clogging, blowers or fans may be mounted on the mower deck or in the grass discharge and collection chute. However, supplemental air handling devices have disadvantages including power requirements, noise, and cost. As a result, it often is preferable to discharge grass clippings from the mower deck to a collection container using only air pressure provided by the cutting blades and surfaces under the deck.

Rear discharge/rear collection mowers most often build up clippings at the base of the mower and chute where the clippings are channeled toward the collection hopper. The build-up may continue until the mower is unable to successfully discharge or collect the grass clippings. The operator then must remove the collection hopper and manually clean grass clippings out of the chute and mower sub-chute. Build-up typically cannot be removed without manually scraping the chute surfaces. This requires stopping the mower and/or removing the chute. As a result, productive mowing time is reduced.

A cleanout mechanism is needed for a rear discharge/rear collection mower that does not require stopping the mower and/or removing the chute. A cleanout mechanism is needed that does not require manually scraping the chute surfaces. A cleanout mechanism is needed for a grass discharge and collection chute that maximizes productive mowing time.

SUMMARY OF THE INVENTION

A cleanout mechanism for a grass discharge and collection chute includes a wiper hinged to a side of the chute, and a door in the bottom of the chute. An operator control linked to the wiper and the door can simultaneously pivot the wiper rearwardly and open the door. The cleanout mechanism removes grass clippings from the discharge and collection chute so that the deck and chute will not become filled or plugged with grass clippings during use. The cleanout mechanism can operate without stopping the mower or removing the chute. The cleanout mechanism can operate while continuing to mow grass.

DESCRIPTION OF THE PREFERRED EMBODIMENT

Figure 1:
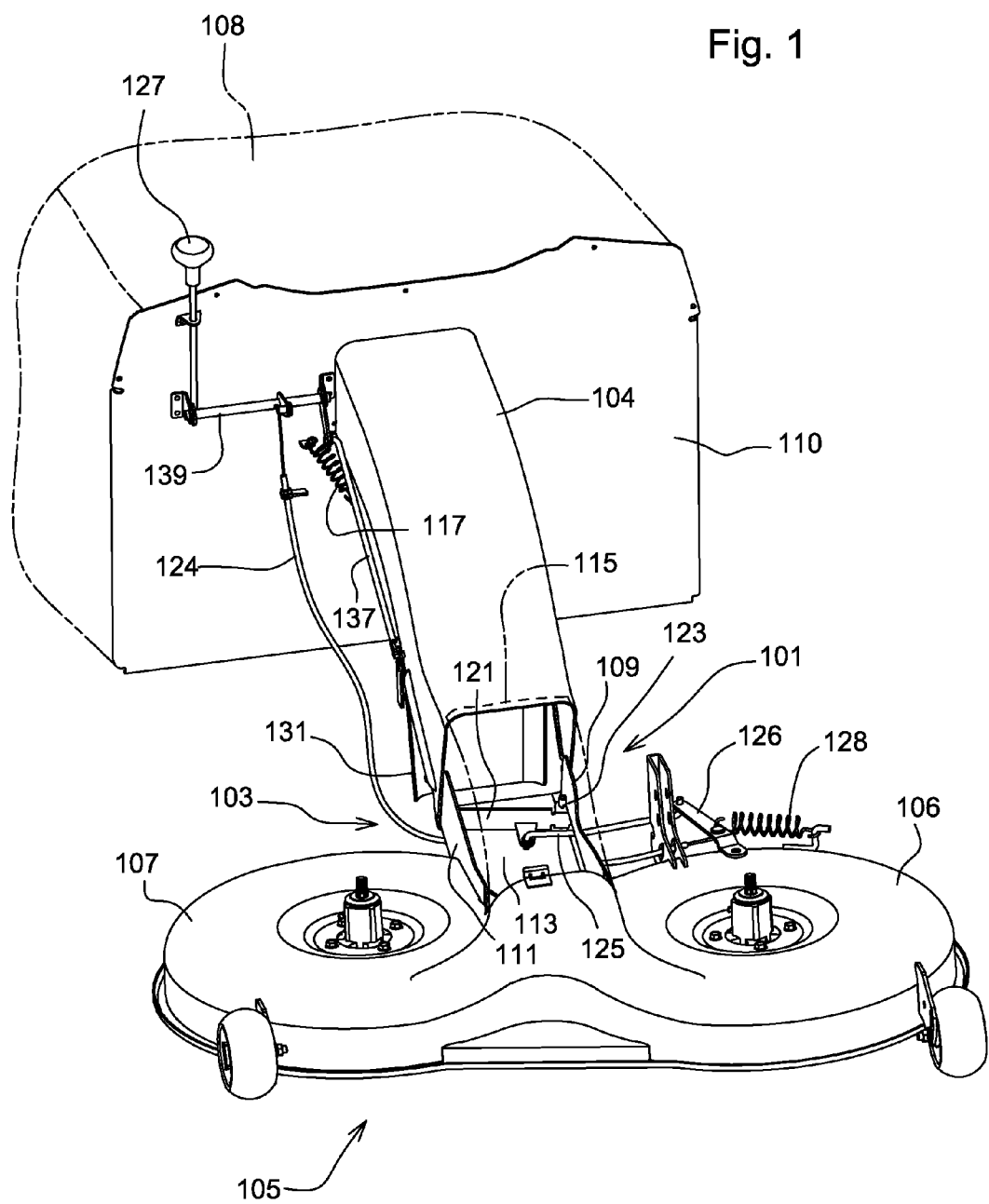
FIG. 1 is a front perspective view of a rear discharge/rear collection mower deck with a cleanout mechanism for a grass discharge and collection chute according to a first embodiment of the invention, with the cleanout mechanism in a first or actuated position.
Figure 2:
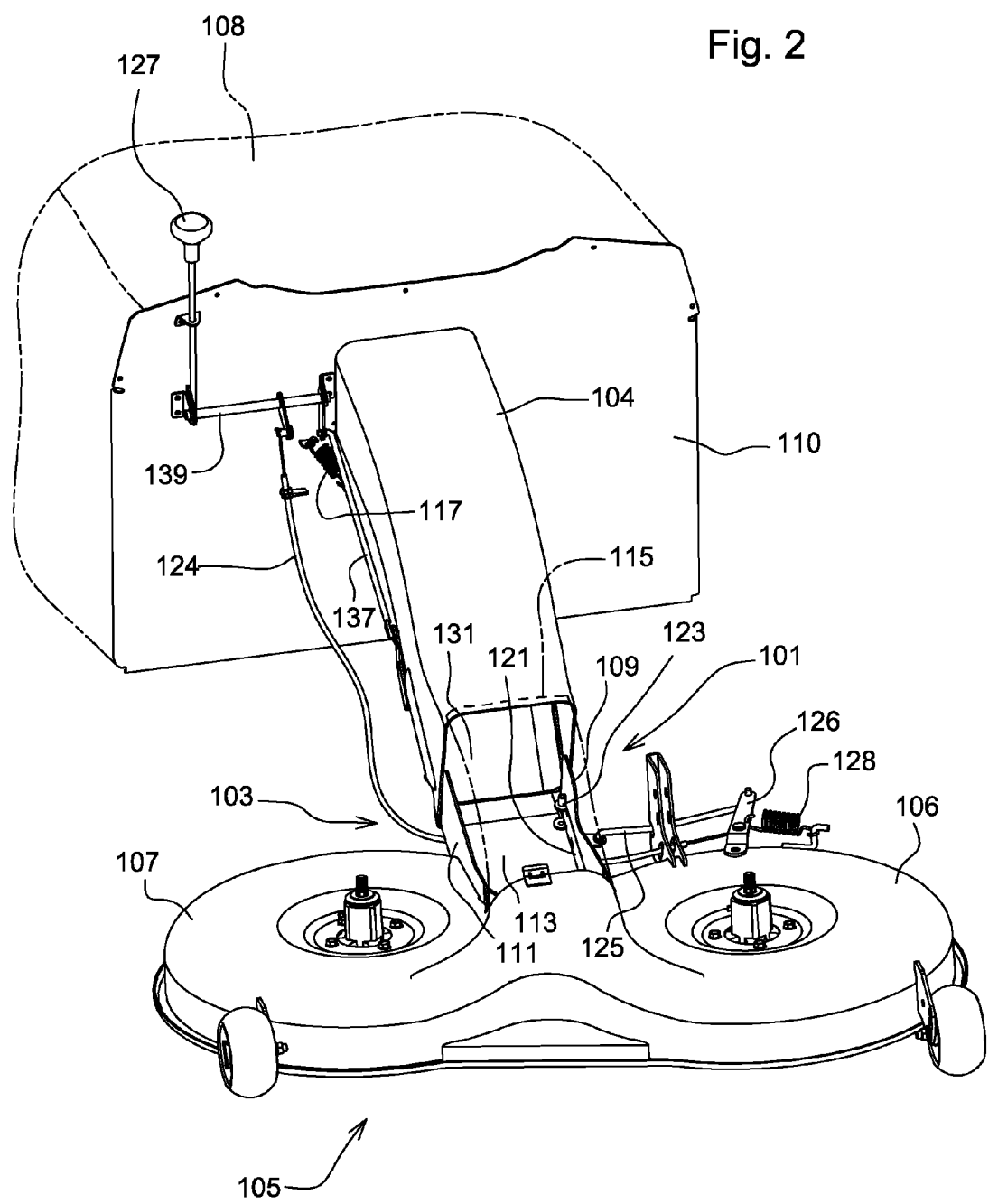
FIG. 2 is a front perspective view of a rear discharge/rear collection mower deck with a cleanout mechanism for a grass discharge and collection chute according to a first embodiment of the invention, with the cleanout mechanism in a second or un-actuated position.
Figure 3:
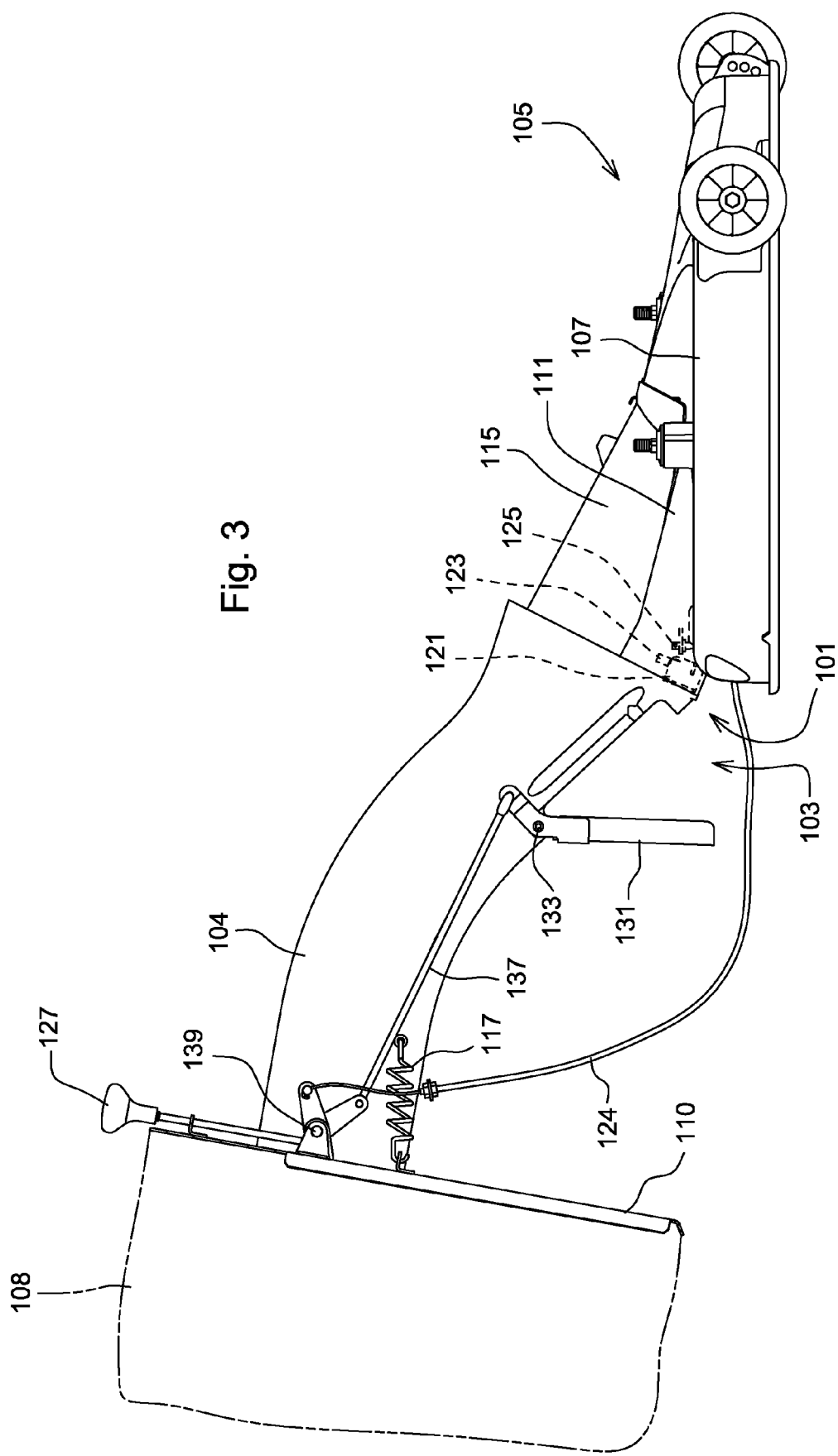
FIG. 3 is a side of a rear discharge/rear collection mower deck with a cleanout mechanism for a grass discharge and collection chute according to a first embodiment of the invention, with the cleanout mechanism in a first or actuated position.
Figure 4:
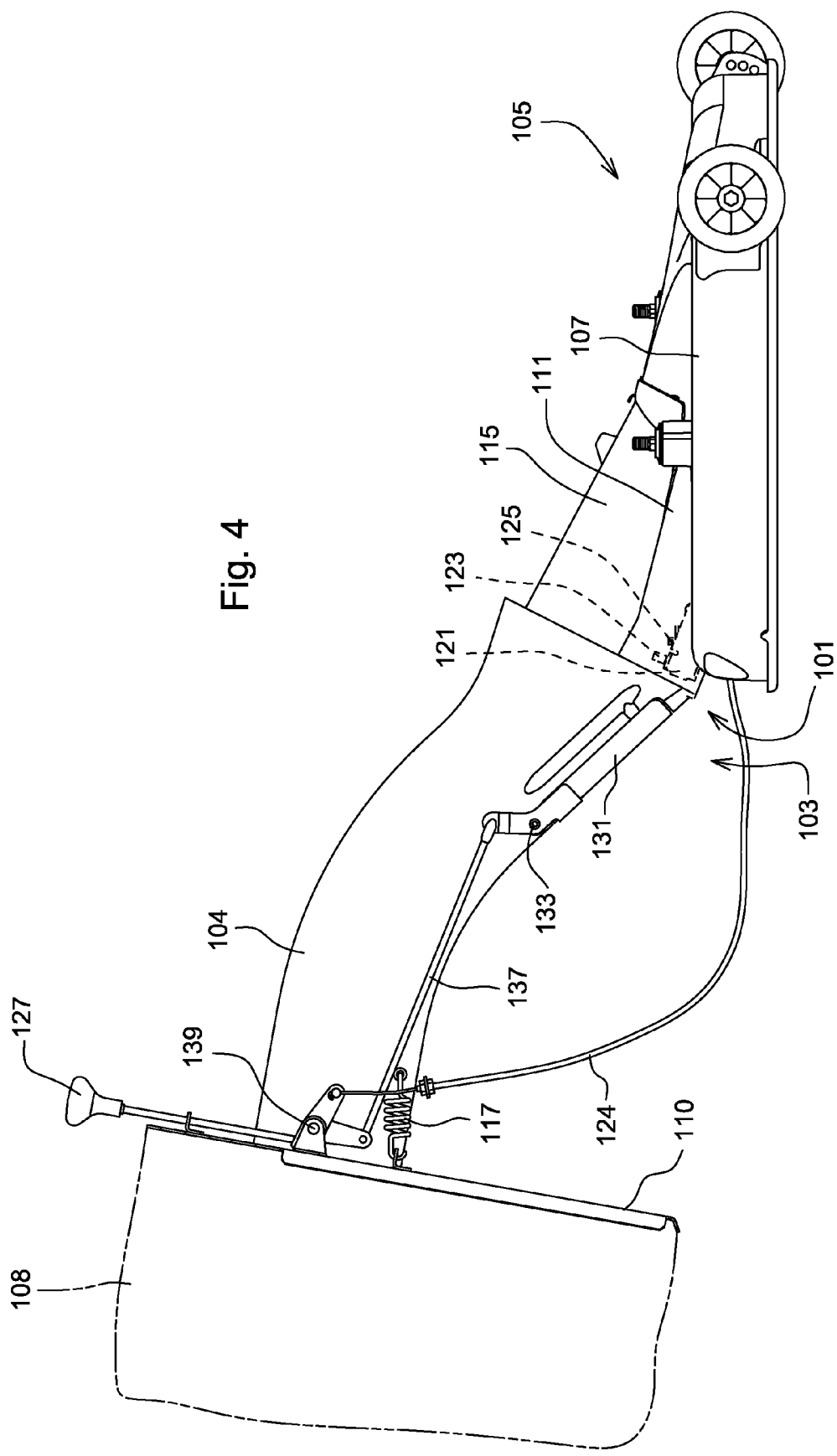
FIG. 4 is a side view of a rear discharge/rear collection mower deck with a cleanout mechanism for a grass discharge and collection chute according to a first embodiment of the invention, with the cleanout mechanism in a second or un-actuated position.

In one embodiment, cleanout mechanism 101 is provided for a counter-rotating, rear discharge/rear collection mower deck 105. The mower deck may be used in a variety of different mowing vehicles or walk-behind mowers, and in a variety of different mower configurations. For example, one, two, or more decks may be attached to a vehicle. Mower deck 105 may be a two-chamber deck; i.e., with two cutting blades and spindles; and may be positioned at or adjacent the front, middle, or rear of the vehicle. However, in an alternative embodiment, the rear discharge/rear collection mower deck may have one chamber, or three or more chambers, each chamber having a cutting blade attached to a spindle.

In one embodiment, a left cutting chamber 106 and an adjoining right cutting chamber 107 may be positioned side-by-side under the top of the deck. Vertically aligned blade spindles may extend through openings into the left cutting chamber and right cutting chamber under the deck. The left cutting chamber and left blade spindle may be positioned slightly forwardly of the right cutting chamber and right blade spindle, so there is some overlap of the left and right cutting blades during mowing. The spindles may be belt driven by an internal combustion engine or other power source. Alternatively, the spindles may be driven and timed by a toothed belt so that the blades have overlapping cutting paths.

In one embodiment, the blades of the rear discharge/rear collection mower deck may counter rotate. For example, when viewed from under the deck, the left blade may turn clockwise and the right blade may turn counterclockwise. As the cut grass clippings are brought to the center of the deck, the air streams from both blades join, causing the air flow and the volume of cut grass clippings to increase. It is preferred that the blades counter rotate, but the blades may rotate in the same direction in an alternative embodiment.

In one embodiment, lower chute 103, also sometimes referred to as the sub-chute, may extend rearwardly from the mower deck where it connects to or joins upper chute 104, sometimes referred to as the main chute, leading to collection container or hopper 108. Grass clippings may enter the lower chute through an opening in the rear and/or top rear surface of the mower deck. Lower chute 103 may be attached to the rear of the mower deck between the cutting chambers. Lower chute 103 may be a generally U-shaped channel including a pair of side walls 109, 111 connected by bottom wall 113. Additionally, lower chute 103 may include shroud 115 which extends rearwardly to cover at least part of the lower chute, and may slope upwardly where the lower chute joins upper chute 104. Upper chute 104 may have a generally rectangular cross section, and may extend upwardly and rearwardly from the lower chute to an opening in backplate 110. The backplate is a generally vertical or near vertically aligned panel at the rear of a mowing vehicle, where collection hopper 108 is mounted. Collection hopper 108 may be mounted to abut or close against backplate 110 when it is used to collect grass clippings, and the collection hopper also can pivot away from the backplate to dump the collected grass clippings.

In one embodiment, cleanout mechanism 101 includes wiper 121 and door 131. The operator may actuate the wiper and door simultaneously using operator control 127, which is connected to the wiper and door by mechanical or electro-mechanical linkages. When the operator control is actuated, the wiper pushes grass clippings rearwardly so that the clippings can drop through an opening in the bottom of the grass discharge and collection chute. The cleanout mechanism, including wiper 121, door 131 and operator control 127 can be used while continuing to mow, discharge and/or collect grass from the mowing deck. An operator may actuate the cleanout mechanism and its components to clean out any blockage or grass buildup in the grass discharge and collection chute without stopping the mower, disconnecting or removing the chute, or manually scraping the chute. Operation of the wiper and door do not interfere with rotation of the mower blades, nor do the mower blades interfere with the wiper and door.

In one embodiment, cleanout mechanism 101 includes wiper 121 that is pivotably connected to lower chute 103 adjacent the rear of the mower deck between the cutting chambers. When operator control 127 is actuated, wiper 121 pivots and sweeps grass rearwardly along the bottom surface 113 of the lower chute. Wiper 121 may have a width sufficient to extend across most or all of the width of bottom surface 113 of the lower chute in the first or actuated position. Optionally, when the wiper reaches the first or actuated position, it may be perpendicular to the chute or between about 5 degrees and about 10 degrees past perpendicular. Additionally, the wiper may have a height dimension of between about ¼ and about ½ of the height of the lower chute side walls 109, 111. The wiper's height is substantially less than the lower chute's height, and preferably less than about one-half the lower chute's height, so that when the cleanout mechanism is actuated, the wiper blocks only some of the chute's cross section area, preferably less than about one-half the lower chute's cross section area. As a result, while the cleanout mechanism is in the actuated position, the mower still can cut grass, and airflow through the chute is largely unblocked. Grass clippings can flow over the wiper and are discharged and collected through the chute.

In one embodiment, a first end of wiper 121 may be attached to vertically aligned hinge 123 at or adjacent side wall 109 of the chute. Wiper 121 may be connected to operator control 127 through mechanical or electro-mechanical linkages such as rod 125, pivot arm 126, cable 124, and shaft 139. Spring 128 connected to pivot arm 126 may bias wiper 121 to the second, un-actuated position where the wiper is positioned against side wall 109 of the lower chute 103. An operator may actuate the operator control using the linkages to overcome the spring bias force, pivoting the wiper to swing rearwardly away from side wall 109 to the first, actuated position. In the first, actuated position, the wiper is located adjacent to an opening in the bottom surface of the chute. As the wiper pivots toward the first, actuated position, it pushes grass clippings on the bottom wall of the lower chute rearwardly. When the operator releases the operator control, the spring urges the wiper to pivot forward to the second or un-actuated position against the lower chute side wall.

In one embodiment, cleanout mechanism 101 also includes door 131 hinged to the bottom wall of upper chute 104. A first end of door 131, preferably the end of the door at the downstream or rearmost end of the door, is provided with horizontally aligned hinge 133 adjacent an opening in the bottom wall of the chute. The door is connected by linkages to operator control 127, such as rod 137 and 139. Spring 117 connected to rod 137 may bias door 131 to the second, un-actuated position where the door is closed against the bottom surface of upper chute 104. In the second un-actuated position, the door covers an opening in the bottom of upper chute 104. An operator may actuate the operator control using the linkages to overcome the spring bias force, pivoting the door to swing downwardly and rearwardly away from the upper chute to the first, actuated position. As the door pivots toward the first, actuated position, it uncovers an opening in the bottom of the chute and allows grass clippings pushed rearwardly by wiper 121 to drop or be ejected to the ground. The actuated wiper is located adjacent the uncovered opening in the bottom surface of the chute. When the operator releases the operator control, the spring urges the door to pivot up and forward to the second or un-actuated position covering the opening in the chute.

In one embodiment, the cleanout mechanism may be operated from the operator's seat at any time before or after grass build-up occurs. Wiper 121 pushes rearwardly any grass build-up at or in the base of the chute near the mower deck, and that build-up is ejected or dropped onto the ground through the opening left by door 131. The mower cleanout mechanism may be operated without stopping the mower, turning off the engine or mower blades, and without disassembling or disconnecting the chute or removing the collection container or hopper. As a result, productivity is increased.

In one embodiment, air flow from the mower deck may assist in removing sticky grass build-up in the chute. Dislodged plugs can either be channeled to the hopper or fall to the ground. Additionally, in one embodiment, the cleanout mechanism may cycle each time the collection hopper is opened.

Having described the preferred embodiment, it will become apparent that various modifications can be made without departing from the scope of the invention as defined in the accompanying claims.

The invention claimed is:

1. A cleanout mechanism for a grass discharge and collection chute on a mower, comprising:
   a wiper hinged to a side of the grass discharge and collection chute;
   a door downstream of the wiper in a bottom of the grass discharge and collection chute; and
   an operator control linked to the wiper and the door to simultaneously pivot the wiper rearwardly and open the door downwardly to discharge an obstruction downwardly through the open door.

2. The cleanout mechanism of claim 1 wherein the wiper has a height dimension of less than about one-half of the height of the side of the grass discharge and collection chute.

3. The cleanout mechanism of claim 1 wherein the door is hinged to the bottom of the grass discharge and collection chute.

4. The cleanout mechanism of claim 3 wherein the door is pivotable rearwardly and downwardly.

5. The cleanout mechanism of claim 1 further comprising a spring biasing the wiper toward a position on the side of the grass discharge and collection chute.

6. The cleanout mechanism of claim 1 further comprising a spring biasing the door toward a position against the bottom of the grass discharge and collection chute.

7. A cleanout mechanism for a grass discharge and collection chute on a mower, comprising:
- a wiper movable between a first, actuated position extending across the chute, and a second, unactuated position on a side of the chute;
- a door movable between a first, actuated position uncovering an opening in a bottom of the chute, and a second, unactuated position covering the opening in the bottom of the chute; and
- an operator control linked to the wiper and the door to move both the wiper and the door between their first, actuated positions and their second, unactuated positions so that the wiper can move an obstruction in the chute to a position over the door where the obstruction can drop downwardly through the door.

8. The cleanout mechanism of claim 7 further comprising a spring biasing the wiper to the second, unactuated position.

9. The cleanout mechanism of claim 7 further comprising a spring biasing the door to the second, unactuated position.

10. The cleanout mechanism of claim 7 wherein the wiper has a height less than about one-half the height of the chute.

11. The cleanout mechanism of claim 7 wherein the mower includes at least one rotatable cutting blade under a mower deck, the wiper and the door being movable between their first, actuated positions and second, unactuated positions while rotating the cutting blade.

12. The cleanout mechanism of claim 7 wherein the chute extends upwardly and rearwardly from a mower deck to a collection hopper.

13. The cleanout mechanism of claim 7 wherein the wiper and door are each hinged to the chute.

14. A cleanout mechanism for a grass discharge and collection chute on a mower, comprising:
- a door pivotable downwardly from the chute to provide an opening in a bottom surface of the chute;
- a wiper pivotable rearwardly along the bottom surface of the chute toward a position adjacent the opening; and
- an operator control connected through linkages to the door and the wiper to pivot both of the door and the wiper while permitting continued operation of the mower and discharging from the chute downwardly through the opening.

15. The cleanout mechanism of claim 14 wherein the door is biased to close the opening in the bottom surface of the chute.

16. The cleanout mechanism of claim 14 wherein wiper is biased toward a side wall of the chute.

17. The cleanout mechanism of claim 14 wherein the door and the wiper are mounted to the chute by hinges.

18. The cleanout mechanism of claim 14 wherein the chute extends upwardly and rearwardly to a collection hopper.

19. The cleanout mechanism of claim 14 wherein the wiper in the position adjacent the opening blocks less than about one-half of the chute.

* * * * *